US012583741B2

(12) United States Patent
Chernousov et al.

(10) Patent No.: US 12,583,741 B2
(45) Date of Patent: Mar. 24, 2026

(54) ALUMINUM COMPOSITE FOR HYDROGEN GENERATION AND METHODS OF PREPARATION THEREOF

(71) Applicant: The Hong Kong University of Science and Technology, Hong Kong (CN)

(72) Inventors: Andrey Chernousov, Hong Kong (CN); Yui Bun Chan, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 727 days.

(21) Appl. No.: 18/066,314

(22) Filed: Dec. 15, 2022

(65) Prior Publication Data
US 2023/0202838 A1     Jun. 29, 2023

Related U.S. Application Data

(60) Provisional application No. 63/293,668, filed on Dec. 24, 2021.

(51) Int. Cl.
*C01B 3/08* (2026.01)
*C01F 7/02* (2022.01)

(52) U.S. Cl.
CPC .................. *C01B 3/08* (2013.01); *C01F 7/02* (2013.01); *C01P 2002/70* (2013.01); *C01P 2004/03* (2013.01); *C01P 2004/61* (2013.01); *C01P 2004/64* (2013.01)

(58) Field of Classification Search
CPC ................ C01B 3/02; C01B 3/08; C01F 7/02
See application file for complete search history.

(56) References Cited

U.S. PATENT DOCUMENTS

| | | | |
|---|---|---|---|
| 6,582,676 B2 | 6/2003 | Chaklader | |
| 7,938,879 B2 | 5/2011 | Woodall et al. | |
| 9,889,429 B2 | 2/2018 | Helton | |
| 2009/0267023 A1 | 10/2009 | Miki et al. | |
| 2010/0080755 A1 | 4/2010 | Parker et al. | |
| 2012/0027671 A1 | 2/2012 | Wang et al. | |
| 2019/0024216 A1 | 1/2019 | Giri et al. | |

FOREIGN PATENT DOCUMENTS

| | | | |
|---|---|---|---|
| AT | 504292 A1 | 4/2008 | |
| CN | 101289163 B | 4/2011 | |
| CN | 102333722 A | 1/2012 | |

OTHER PUBLICATIONS

Petrovic, Reaction of aluminum with water to produce hydrogen, US Department of Energy, Version 2 (Year: 2010).*

* cited by examiner

*Primary Examiner* — James A Fiorito
(74) *Attorney, Agent, or Firm* — S&F/WEHRW

(57) ABSTRACT

A method of generating hydrogen involving contacting an aqueous solution with an activated aluminum composite including aluminum, AlN, $\gamma$-Al$_2$O$_3$, and optionally a carbonaceous material. The activated aluminum composite can safely be stored and can be used for safe on demand hydrogen generation in water.

21 Claims, 13 Drawing Sheets

10 providing aluminum flakes 20 providing a specific container and loading aluminum particles and additives 30 shock heating and annealing 40 cooling down and removal of active aluminum particles 50 (optionally) compaction of active Al particles into cassettes 60 (optionally) fill cassettes into a storage/generation system 70 (optionally) soaking Al cassettes in warm water 10 providing aluminum flakes 20 providing a specific container and loading aluminum particles and additives 30 shock heating and annealing 40 cooling down and removal of active aluminum particles 50 (optionally) compaction of active Al particles into cassettes 60 (optionally) fill cassettes into a storage/generation system 70 (optionally) soaking Al cassettes in warm water

FIG. 1

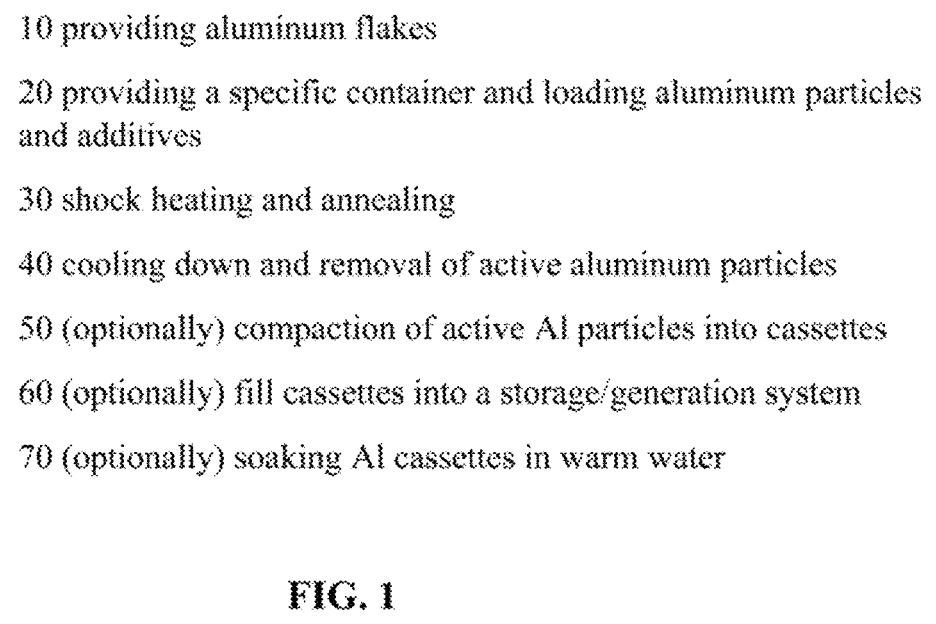

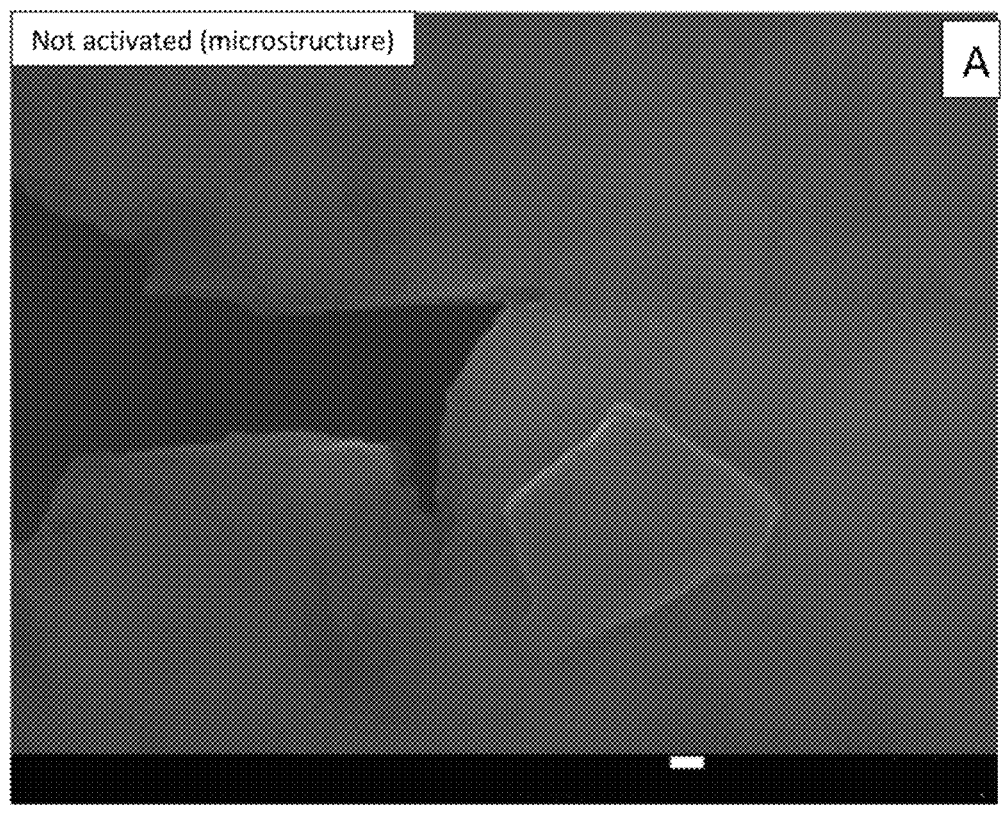
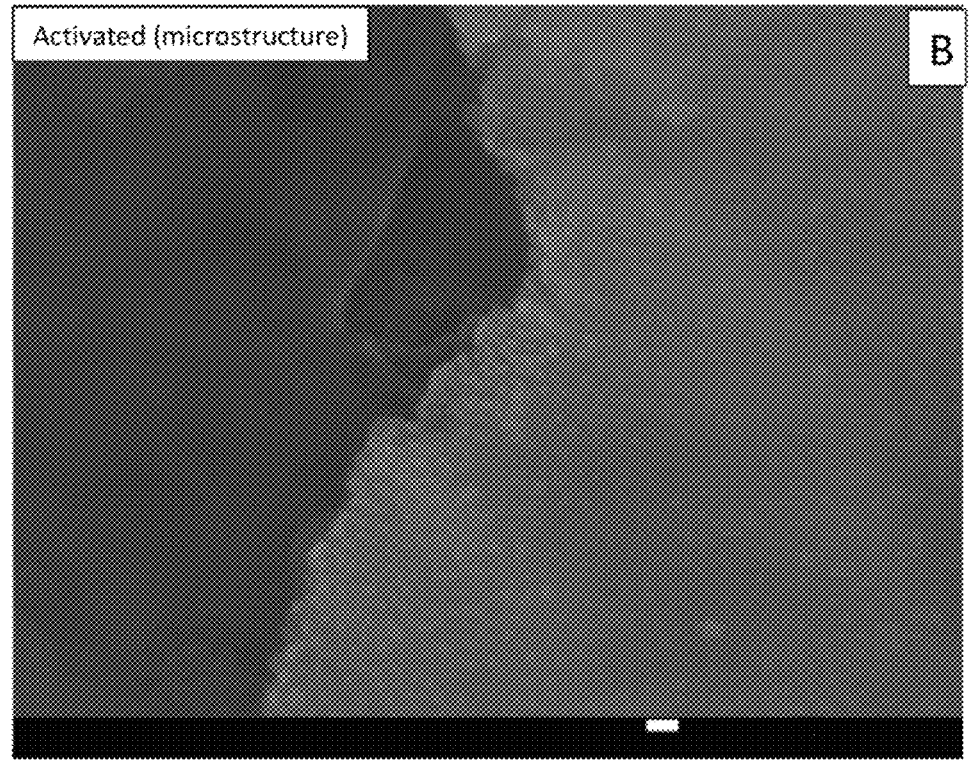
FIG. 4

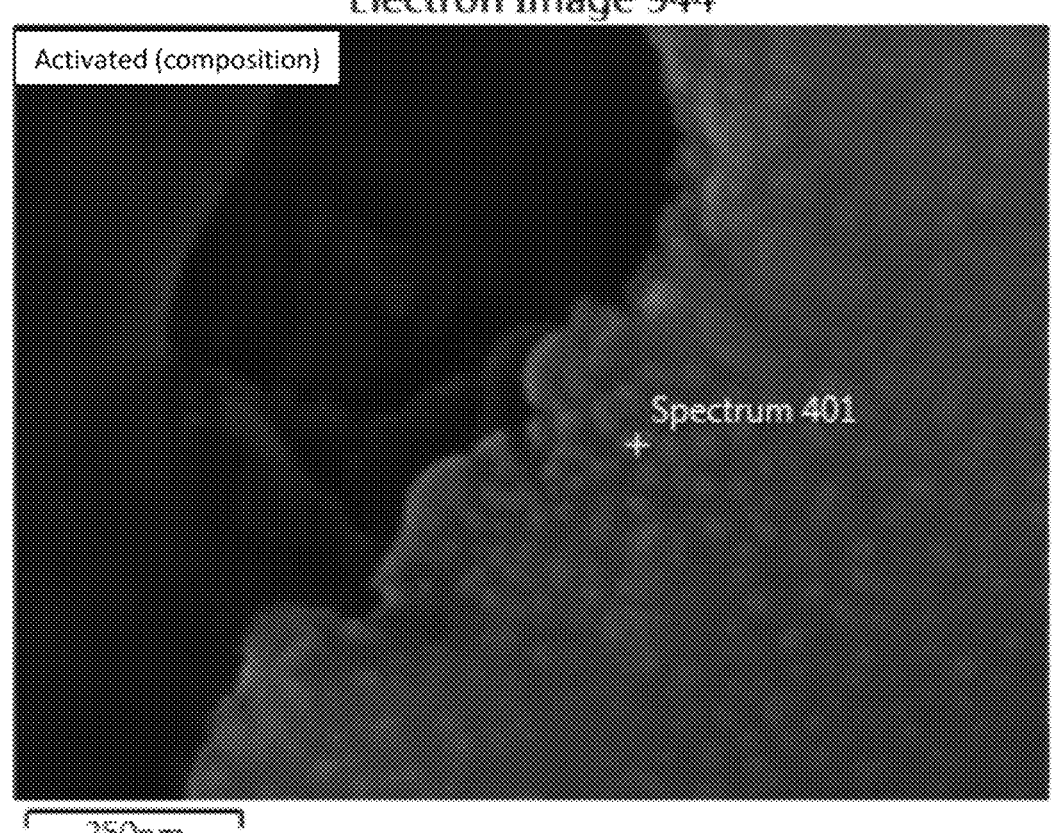
FIG. 5

| Element | Line Type | Wt% | Wt% Sigma | Atomic % |
|---|---|---|---|---|
| C | K series | 13.04 | 1.20 | 21.92 |
| N | K series | 5.51 | 0.97 | 7.95 |
| O | K series | 17.88 | 0.62 | 22.57 |
| Al | K series | 63.56 | 1.19 | 47.56 |
| Si | substrate | 0 | 0 | 0 |
| Total: | | 100.00 | | 100.00 |

(110) cassettes container
(120) cassettes or activated Al flakes
(130) water container
(140) water
(150) additives
(160) lid
(170) H2 outlet
(180) flow regulator

ALUMINUM COMPOSITE FOR HYDROGEN GENERATION AND METHODS OF PREPARATION THEREOF

CROSS-REFERENCE TO RELATED APPLICATIONS

The present application claims priority from U.S. Provisional Patent Application No. 63/293,668, filed on Dec. 24, 2021, which is hereby incorporated by reference in its entirety.

TECHNICAL FIELD

The present disclosure generally relates to an aluminum composite useful for generating hydrogen gas and methods of use thereof.

BACKGROUND

Hydrogen is increasingly replacing fossil fuels in the transportation industry as its burning produces only water instead of air polluting gases. Conventional large-scale hydrogen production methods include steam reforming of natural gas, coal gasification, and electrolysis. Hydrogen distributing technologies and pipelines are still in early development. Consequently, manufacturers typically deliver $H_2$ in steel containers at pressures below 150 bar. At this pressure, a 65 kg steel cylinder can carry only about 0.5 kg of $H_2$, or $\approx 0.8$ wt % in terms of the gravimetric $H_2$ density. New technologies propose carbon fiber reinforced polymer (CFRP) cylinders that are lighter in weight and accommodate about five times more $H_2$ at higher pressures, up to 700 bar. However, these polymer composite containers are costly and unstable at elevated temperatures. A notable approach is to store $H_2$ in solid-state materials such as metal hydrides $MH_n$, alanates $MAl(H_4)_n$, amides $M(NH_2)_n$, borohydrides $M(BH_4)_n$. Although complex compounds can have up to 17 wt % gravimetric $H_2$ density, these metal hydrides require chemical reactants to regenerate $H_2$. Other options are the reversible room temperature alloys (e.g., $FeTiH_{1.7}$ or $LaNi_5H_6$) commercially available in steel tanks for charging at pressures of 15-30 bars and discharging. These alloys have a relatively low gravimetric $H_2$ density, ~2 wt %, further dropping to 1 wt % when contained in a steel tank. Nevertheless, this option can be economically viable for the capacity of more than 10,000 charging/discharging cycles.

Hydrogen can be generated through accelerated corrosion (oxidation) of fine metal particles in water. Aluminum is an abundant and lightweight element, imparting a gravimetric $H_2$ density of $\approx 11$ wt %. After adding water and promoters, the oxidation generates hydrogen at atmospheric pressure:

$$Al+3H_2O \rightarrow Al(OH)_3+1.5H_2(g), \Delta H_{RT} \approx -4.3 \text{ kWh/kg}_{Al} \quad (1)$$

This reaction generates a great deal of heat, 4.3 kWh/kg$_{Al}$, and produces aluminum hydroxide clay, which is widely used as fire-retardant materials, medical applications and has other uses. This technology is promising for hydrogen backup systems in remote towns, villages, and marine vessels. However, Al particles cannot be oxidized in pure water due to the passivation mechanism that can readily heal the native alumina skin by the formation of a layer of am-$Al_2O_3$. Therefore, continuous disruption of the alumina skin requires fine aluminum particles, high temperatures (>100° C.), acidic (low pH) or alkaline (high pH) solutions, electrical current, and their combinations. The most effective promoters of aluminum oxidation are hydroxides NaOH, KOH, and Ca(OH)$_2$, but the molarity of NaOH solutions, for instance, ranges from 1 to 5 M (4-20 wt % NaOH). That makes the systems of packed aluminum particles troublesome in storage and operation. Therefore, most methods for generating $H_2$ from fine aluminum particles optimize and even exclude alkaline additives from water.

Hydrogen generation in pure water without alkaline promoters has been shown to efficiently proceed with aluminum nanoparticles in a protective skin of oleic acid. In such systems aluminum nanoparticles (20-65 nm) in organic skins can represent ~35 wt % of the product mass. These aluminum nanoparticles are produced by decomposing an alane precursor, $AlH_3$ or $(AlH_3)_n$, or alane complexes such as dimethyl ethyl alane in the presence of a catalyst such as titanium (IV) isopropoxide and an organic passivation agent such as oleic acid. Since the $H_2$ generation rate in pure water is very high, 0.01 g of $H_2$ s$^{-1}$ from one gram of this composition, these aluminum nanoparticles are unsafe for storage and transportation in large amounts. The other drawbacks are a relatively low hydrogen yield (~65%), high production cost, and difficulties in handling the aluminum nanoparticles.

Methods involving aluminum microparticles have been developed however they are disadvantaged by rapid reaction rates, high risk of combustion during storage, relatively low reaction yield, and high costs of production.

There thus exists a need for compositions and methods useful for hydrogen generation that overcome at least some of the disadvantages described above.

SUMMARY

The present disclosure provides to an activated aluminum composite comprising aluminum and AlN. $\gamma$-$Al_2O_3$, and optionally a carbonaceous material useful for on demand hydrogen generation. The activated aluminum composite described herein can be prepared by thermal shock heating of aluminum optionally in the presence of a carbonaceous material precursor. The heat treatment can be carried out by rapid heating one or more times to initiate the growth of AlN with defected microstructure. In certain embodiments, carbonaceous material and $\gamma$-$Al_2O_3$ are primarily formed in the cracks of the AlN skin and can provide galvanic pairs with the aluminum. The carbonaceous material can comprise a mixture of compounds comprising one or more of aluminum, carbon, oxygen, and nitrogen.

In a first aspect, provided herein is a method of generating hydrogen ($H_2$) comprising contacting an aqueous solution with an activated aluminum composite comprising aluminum, $\gamma$-$Al_2O_3$, AlN and optionally a carbonaceous material thereby forming $H_2$.

In certain embodiments, the activated aluminum composite comprises aluminum composite flakes having a diameter $D_{50}$ of 1-50 μm and a thickness $D_{50}$ of 10-100 nm.

In certain embodiments, a layer comprising the $\gamma$-$Al_2O_3$, the AlN, and optionally the carbonaceous material is disposed on the surface of the aluminum.

In certain embodiments, the carbonaceous material comprises carbon and one or more elements selected from the group consisting of nitrogen and oxygen.

In certain embodiments, the carbonaceous material is prepared by carbonization of a carbonaceous material precursor selected from the group consisting of a carboxylic acid, a polyvinyl alcohol, an epoxy resin, and salts thereof.

In certain embodiments, the carbonaceous material precursor is a $C_6$-$C_{25}$ saturated carboxylic acid, a $C_6$-$C_{25}$ unsaturated carboxylic acid, or a salt thereof.

In certain embodiments, the carbonaceous material precursor is lauric acid, palmitic acid, stearic acid, or a salt thereof.

In certain embodiments, the activated aluminum composite comprises at least 85% of aluminum by weight.

In certain embodiments, the activated aluminum composite comprises aluminum composite flakes has a diameter $D_{50}$ of 10-30 μm and a thickness $D_{50}$ of 10-100 nm; the carbonaceous material is prepared by carbonization of a carbonaceous material precursor selected from the group consisting of a carboxylic acid, a polyvinyl alcohol, and salts thereof; and the activated aluminum composite comprises at least 87% of aluminum by weight.

In certain embodiments, the activated aluminum composite is prepared from aluminum component machining, aluminum cans or aluminum scrap; and the aluminum composite comprises particles ranging from 1 to 10,000 μm in length and having a thickness of less than 500 μm.

In certain embodiments, the carbonaceous material is prepared by carbonization of stearic acid or a salt thereof.

In certain embodiments, the method further comprises providing an aluminum mixture comprising aluminum and optionally a carbonaceous material precursor; subjecting the aluminum mixture to one or more thermal shock heating cycles, wherein the one or more thermal shock heating cycles independently comprise heating the aluminum mixture at a rate of 40-400° C. min$^{-1}$ to 450-650° C. thereby forming a heat shocked aluminum mixture; and annealing the heat shocked aluminum mixture at 450-650° C. thereby forming the activated aluminum composite.

In certain embodiments, the aluminum mixture is subjected to 1-4 thermal shock heating cycles.

In certain embodiments, the heat shocked aluminum mixture is annealed at a temperature between 500-650° C.

In certain embodiments, the aqueous solution has a pH equal to or greater than 7.

In certain embodiments, the aqueous solution has a pH 12.4-13.4 or 13-13.4.

In certain embodiments, the aqueous solution comprises NaCl, KCl, or CaCl$_2$.

In certain embodiments, the aqueous solution comprises distilled water or seawater.

In certain embodiments, H$_2$ is generated at a rate less than 500 ml min$^{-1}$ per gram of activated aluminum composite, wherein the volume of generated H$_2$ is measured at a temperature of 22° C. and atmospheric pressure.

In certain embodiments, the activated aluminum composite comprises aluminum composite flakes or spherical aluminum particles that have a diameter $D_{50}$ of 10-30 μm and a thickness $D_{50}$ of 10-100 nm; the carbonaceous material is prepared by carbonization of stearic acid; the activated aluminum composite comprises at least 85% of aluminum by weight; the aqueous solution has a pH 13-13.4; and H$_2$ is generated at a rate less than 500 ml min$^{-1}$ per gram of activated aluminum composite, wherein the volume of generated H$_2$ is measured at atmospheric pressure and temperature.

In certain embodiments, the method further comprises providing an aluminum mixture comprising aluminum and stearic acid; subjecting the aluminum mixture to one or more thermal shock heating cycles, wherein the one or more thermal shock heating cycles independently comprise heating the aluminum mixture at a rate of 40-400° C. min$^{-1}$ to 450-650° C. or cooling the aluminum mixture from 450-650° C. to 100-200° C. thereby forming a heat shocked aluminum mixture; and annealing the heat shocked aluminum mixture at a temperature between 450-650° C. thereby forming the activated aluminum composite.

The activated aluminum composite described herein can be prepared by rapid transformations of aluminum in a partially sealed metal container in the air or nitrogen atmosphere.

The activated aluminum composite can be subjected to densification/compression into cassettes with different levels of open porosity. The porous cassettes are convenient in handling, safe in long-time storage, humid air, and fire conditions. The present invention also provides methods of hydrogen generation using slightly alkaline water, seawater, groundwater, tap water, distilled water, deionized water, and heavy water. In the last example, the system produces deuterium gas instead of hydrogen. Without wishing to be bound by theory, it is believed that the composite structure can bind water and such bonded water can be released on heating and reacts with the Al in order to produce hydrogen. The present disclosure also provides a system for implementation of the methods disclosed herein. The packaging container for the activated aluminum composite and/or cassettes comprising the activated aluminum composite can be made of high-density polyethylene, low-density polyethylene, polypropylene, glasses, ceramics, and metal alloys. In certain embodiments, a group of packaging containers can be connected in series using pipes, flow regulators, fittings, sensors, purification devices, and other accessories. In other embodiments, the cassettes are rechargeable with hydrogen and generate a mixture of gases after heating to a particular temperature.

BRIEF DESCRIPTION OF THE DRAWINGS

The above and other objects and features of the present disclosure will become apparent from the following description of the disclosure, when taken in conjunction with the accompanying drawings.

FIG. 1 shows a schematic showing an exemplary method for producing the activated aluminum flake cassettes in accordance with certain embodiments described herein.

DETAILED DESCRIPTION

Definitions

Figure 2:
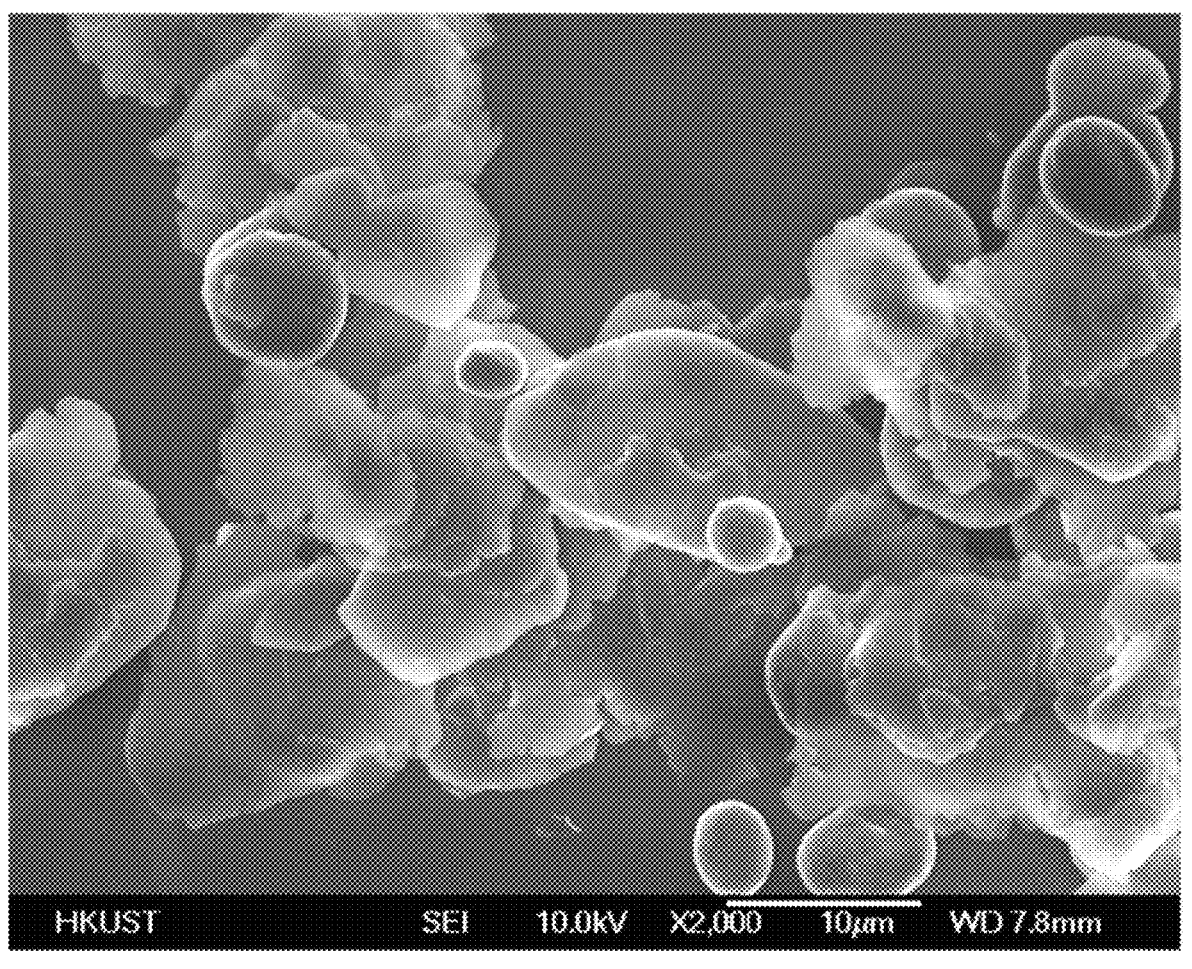
FIG. 2 shows scanning electron microscopy (SEM) images of the initial aluminum particles in accordance with certain embodiments described herein.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

It should be understood that the order of steps or order for performing certain actions is immaterial so long as the present teachings remain operable. Moreover, two or more steps or actions may be conducted simultaneously.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10%, ±7%, ±5%, ±3%, ±1%, or ±0% variation from the nominal value unless otherwise indicated or inferred.

The present disclosure provides an activated aluminum composite comprising aluminum, $\gamma$-Al$_2$O$_3$, aluminum nitride (AlN) and optionally a carbonaceous material. In certain embodiments, the activated aluminum composite comprises a layer comprising $\gamma$-Al$_2$O$_3$ and AlN disposed on the surface of the aluminum, wherein the $\gamma$-Al$_2$O$_3$ and AlN comprise surfaces defects, such as cracks, fractures, fissures, craters, and the like and carbonaceous material is disposed on the surface of the $\gamma$-Al$_2$O$_3$ and/or AlN.

Without wishing to be bound by theory the aluminum nitride is theorized to provide an unstable protective layer in water, which can be permeated by carbon and $\gamma$-Al$_2$O$_3$ inserted into its structure. The layers of nitride can be present within aluminum so their destruction simultaneously exposes pure aluminum to oxidation and hydrogen generation.

The activated aluminum composite can comprise Al$_2$O$_3$ in a predominately crystalline $\gamma$-Al$_2$O$_3$ phase. However, it is not a requirement that all of the Al$_2$O$_3$ present in the activated aluminum composite be uniformly $\gamma$-Al$_2$O$_3$ phase. The activated aluminum composite can comprise aluminum hydroxide Al(OH)$_3$ and/or aluminum hydroxide hydrate Al(OH)$_3$×xH$_2$O, wherein x can be 1, 2 or 3.

The carbonaceous material can result from carbonizing one or more carbonaceous material precursors during the thermal shock heating cycles and/or annealing step used to prepare the activated aluminum composite. The carbonaceous material precursor can be a carboxylic acid, a polyvinyl alcohol, an epoxy resin, or a salt thereof. In certain embodiments, there are only traces, e.g., 0.1% by mass or less, of the carbonaceous material.

The structure of the carboxylic acid is not particularly limited. Saturated, unsaturated, linear, branched, and cyclic carboxylic acids are contemplated by the present disclosure. Non-polymeric carboxylic acids can comprise 1, 2, 3, or 4 carboxylic acid moieties.

In certain embodiments, the carboxylic acid is a C$_6$-C$_{25}$ saturated carboxylic acid, a C$_8$-C$_{25}$ saturated carboxylic acid, a C$_{10}$-C$_{25}$ saturated carboxylic acid, a C$_{10}$-C$_{22}$ saturated carboxylic acid, a C$_{10}$-C$_{20}$ saturated carboxylic acid, a C$_{12}$-C$_{20}$ saturated carboxylic acid, a C$_{14}$-C$_{20}$ saturated carboxylic acid, a C$_{16}$-C$_{20}$ saturated carboxylic acid, a C$_{16}$-C$_{10}$ saturated carboxylic acid, a C$_6$-C$_{25}$ Unsaturated carboxylic acid, a C$_8$-C$_{25}$ unsaturated carboxylic acid, a C$_{10}$-C$_{25}$ unsaturated carboxylic acid, a C$_{10}$-C$_{22}$ unsaturated carboxylic acid, a C$_{10}$-C$_{20}$ unsaturated carboxylic acid, a C$_{12}$-C$_{20}$ unsaturated carboxylic acid, a C$_{14}$-C$_{20}$ unsaturated carboxylic acid, a C$_{16}$-C$_{20}$ unsaturated carboxylic acid, a C$_{16}$-C$_{10}$ unsaturated carboxylic acid, or a salt thereof.

Exemplary carboxylic acids include, but are not limited to, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, arachidic acid, or a salt thereof.

Salts can comprise an alkali metal cation, an alkaline earth metal cation, NH$_4$$^+$, or N$^+$(C$_{1-4}$alkyl)$_4$. Exemplary cations include, but are not limited to, Li$^+$, Na$^+$, K$^+$, Rb$^+$, Cs$^+$, Mg$^{2+}$, Ca$^{2+}$, Sr$^{2+}$, Ba$^{2+}$, and NH$_4$$^+$.

In certain embodiments, the carbonaceous material precursor is stearic acid or a salt thereof.

The activated aluminum composite can comprise 85-98% by weight aluminum (i.e., Al$^0$). In certain embodiments, the activated aluminum composite comprises 85-90%, 91-98%, 92-98%, 93-98%, 94-98%, 95-98%, 96-98%, 92-97%, 92-96%, 92-95%, 93-95%, or about 87% by weight aluminum.

The activated aluminum composite can comprise 0.01-15% by weight of the carbonaceous material. In certain embodiments, the carbonaceous material is present in the activated aluminum composite at 0.01-14% by weight, 0.01-13% by weight, 0.01-12% by weight, 0.1-11% by weight, 0.01-10% by weight, 0.01-9% by weight, 0.01-8% by weight, 0.01-7% by weight, 0.01-6% by weight, 0.01-5% by weight, 0.01-4% by weight, 0.01-3% by weight, 0.01-2.3% by weight, 0.1-2.3% by weight, 0.5-2.3% by weight, 1-2.3% by weight, 1.5-2.3% by weight, or 2-2.3% by weight. In certain embodiments, the carbonaceous material is present in the activated aluminum composite at 10% or less by weight, at 9% or less by weight, at 8% or less by weight, at 7% or less by weight, at 6% or less by weight, at 5% or less by weight, at 4% or less by weight, at 3% or less by weight, at 2.5% or less by weight, at 2.3% or less by weight, at 2% or less by weight, at 1.5% or less by weight, at 1% or less by weight, at 0.5% or less by weight, or at 0.1% or less by weight.

The activated aluminum composite can comprise 0.1-5% by weight of the $\gamma$-$Al_2O_3$. In certain embodiments, the $\gamma$-$Al_2O_3$ is present in the activated aluminum composite at 0.1-4% by weight, 0.1-3% by weight, 0.1-2% by weight, 0.1-1.5% by weight, 0.1-1% by weight, 0.1-0.75% by weight, 0.1-0.5% by weight, 0.1-0.25% by weight.

The activated aluminum composite can comprise 0.1-10% by weight of AlN. In certain embodiments, AlN is present in the activated aluminum composite at 0.1-8% by weight, 0.1-6% by weight, 0.1-4% by weight, 0.1-2% by weight, 0.1-1% by weight, 0.1-0.5% by weight, 0.1-0.25% by weight.

In certain embodiments, the activated aluminum composite further comprises $Al(OH)_3 \times 3H_2O$. The activated aluminum composite can comprise 0.1-20% by weight of $Al(OH)_3 \times 3H_2O$. In certain embodiments, the activated aluminum composite comprises 0.1-15% by weight, 0.1-10% by weight, 0.1-9% by weight, 0.1-8% by weight, 0.1-7% by weight, 0.1-6% by weight, 0.1-5% by weight, 1-5% by weight, 1-4% by weight, or 1-3% by weight of $Al(OH)_3 \times 3H_2O$.

The activated aluminum composite can comprise a plurality of particles. The particles can be any shape or combination of shapes including, but not limited to, angular, flake, spherical cylindrical, and oblong. In certain embodiments, the particles are flake shaped. The flake-shaped particles can have at least one dimension on the micrometer scale and one dimension on the nanometer scale.

In certain embodiments, the activated aluminum composite comprise spherical and/or flake shaped particles that have a diameter $D_{50}$ of 1-50 μm, 5-50 μm, 10-50 μm, 15-50 μm, 20-50 μm, 20-45 μm, 20-40 μm, 20-35 μm, 25-35 μm, or 10-30 μm and a thickness $D_{50}$ of 10-100 nm, 10-90 nm, 10-80 nm, 10-70 nm, 10-60 nm, 10-50 nm, 10-40 nm, 10-30 nm 20-100 nm, 30-100 nm, 40-100 nm, 50-100 nm, 20-90 nm, 30-80 nm, 40-70 nm, or 50-60 nm.

In certain embodiments, shredded or milled aluminum scrap (e.g., flat pieces) is used for the production of the activated aluminum composite with dimensions not more than 10 mm across and less than 0.5 mm in thickness.

In certain embodiments, activated aluminum composite can be molded (e.g., using compression) into a cassette. The cassette can take any shape including, but not limited to, a cube, cuboid, cylinder, triangular prism, hexagonal prism, triangular base pyramid, square-based pyramid, hexagonal pyramid, a planar structure, or a rod. The cassette can also can an irregular shape. In certain embodiments, the cassette is in the shape of a cube or a cuboid.

The porosity of the cassette can be modified by the appropriate selection of the compressive force used to mold the activated aluminum composite particles. In certain embodiments, the cassette has a porosity of 10-70%. In certain embodiments, the cassette has a porosity of 20-70%, 30-70%, 40-70%, 40-60%, or 45-60%.

The activated aluminum composite described herein can be readily prepared from commercially available starting materials. In certain embodiments, the activated aluminum composite is prepared by heat treatment of pigment aluminum particles or Al pastes or aluminum particles without additives; subjecting the aluminum mixture to one or more thermal shock heating cycles thereby forming a heat shocked aluminum mixture; and annealing the heat shocked aluminum mixture in a nitrogen-containing atmosphere (air or nitrogen gas) thereby forming the activated aluminum composite. In certain embodiments, the initial particles for the activation are prepared by cutting and milling Al scrap of any quality and Al alloy composition. This can include but is not limited to Al cans for drinks and oily products, chips, or products of Al component machining.

A carbonaceous material precursor can be added to tune the activity of the aluminum composite, such as a carboxylic acid, a polyvinyl alcohol, an epoxy resin, or a salt thereof.

The structure of the carboxylic acid is not particularly limited. Saturated, unsaturated, linear, branched, and cyclic carboxylic acids are contemplated by the present disclosure. Non-polymeric carboxylic acids can comprise 1, 2, 3, or 4 carboxylic acid moieties.

In certain embodiments, the carboxylic acid is a $C_6$-$C_{25}$ saturated carboxylic acid, a $C_8$-$C_{25}$ saturated carboxylic acid, a $C_{10}$-$C_{25}$ saturated carboxylic acid, a $C_{10}$-$C_{22}$ saturated carboxylic acid, a $C_{10}$-$C_{20}$ saturated carboxylic acid, a $C_{12}$-$C_{20}$ saturated carboxylic acid, a $C_{14}$-$C_{20}$ saturated carboxylic acid, a $C_{16}$-$C_{20}$ saturated carboxylic acid, a $C_{16}$-$C_{10}$ saturated carboxylic acid, a $C_6$-$C_{25}$ unsaturated carboxylic acid, a $C_8$-$C_{25}$ unsaturated carboxylic acid, a $C_{10}$-$C_{25}$ unsaturated carboxylic acid, a $C_{10}$-$C_{22}$ unsaturated carboxylic acid, a $C_{10}$-$C_{20}$ unsaturated carboxylic acid, a $C_{12}$-$C_{20}$ unsaturated carboxylic acid, a $C_{14}$-$C_{20}$ unsaturated carboxylic acid, a $C_{16}$-$C_{20}$ unsaturated carboxylic acid, a $C_{16}$-$C_{10}$ unsaturated carboxylic acid, or a salt thereof.

Exemplary carboxylic acids include, but are not limited to, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, arachidic acid, or a salt thereof.

Salts can comprise an alkali metal cation, an alkaline earth metal cation, $NH_4^+$, or $N^+(C_{1-4}alkyl)_4$. Exemplary cations include, but are not limited to, $Li^+$, $Na^+$, $K^+$, $Rb^+$, $Cs^+$, $Mg^{2+}$, $Ca^{2+}$, $Sr^{2+}$, $Ba_2^+$, and $NH_4^+$.

In certain embodiments, the carbonaceous material precursor is stearic acid or a salt thereof.

The aluminum used to prepare the activated aluminum composite can be aluminum particles. The aluminum particles can be any shape or combination of shapes including, but not limited to, flake, spherical, and oblong. In certain embodiments, the particles are flake shaped. The aluminum flakes can have at least one dimension on the micrometer scale and one dimension on the nanometer scale.

In instances in which the aluminum particles are flakes only, the flakes can have a diameter $D_{50}$ of 1-50 μm, 5-50 μm, 10-50 μm, 15-50 μm, 20-50 μm, 20-45 μm, 20-40 μm, 20-35 μm, 25-35 μm, or 10-30 μm and a thickness $D_{50}$ of 10-100 nm, 10-90 nm, 10-80 nm, 10-70 nm, 10-60 nm, 10-50 nm, 10-40 nm, 10-30 nm 20-100 nm, 30-100 nm, 40-100 nm, 50-100 nm, 20-90 nm, 30-80 nm, 40-70 nm, or 50-60 nm. In other instances the aluminum particles can be spherically or irregularly shaped with a particle size D50 of 1-30 μm, 4.6-30 μm, 10-30 μm, 4.6-10 μm, or 20-30 μm.

The aluminum particles can have a BET surface of between 2-20 $m^2$ $g^{-1}$, 7-20 $m^2$ $g^{-1}$, or 7-15.5 $m^2$ $g^{-1}$. The WCA, when applicable, of the aluminum particles can range from 10,000-50,000 $cm^2$ $g^{-1}$, 16,000-48,000 $cm^2$ $g^{-1}$, 26,000-48,000 $cm^2$ $g^{-1}$, 16,000-26,000 $cm^2$ $g^{-1}$, 20,000-50, 000 $cm^2$ $g^{-1}$, 30,000-50,000 $cm^2$ $g^{-1}$, 40,000-50,000 $cm^2$ $g^{-1}$, or 30,000-40,000 $cm^2$ $g^{-1}$.

The concentration of the carbonaceous material precursor in the aluminum mixture can be 30% wt/wt or less, 25% wt/wt or less, 20% wt/wt or less, 15% wt/wt or less, 10% wt/wt or less, 5% wt/wt or less, 4% wt/wt or less, 3% wt/wt or less, 2% wt/wt or less, 1.5% wt/wt or less, or 1% wt/wt or less, relative to the weight of the other constituents. In certain embodiments, the concentration of the carbonaceous material precursor in the aluminum mixture is 1-30% wt/wt, 1-25% wt/wt, 1-20% wt/wt, 1-18.3% wt/wt, 1.5-18.3% wt/wt, 3-18.3% wt/wt, 1-15% wt/wt, 1-10% wt/wt, 1-5% wt/wt, or 1.5-3% wt/wt, relative to the weight of the other constituents.

The concentration of the aluminum in the aluminum mixture can be at least 99% wt/wt, at least 98.5% wt/wt, at least 98% wt/wt, at least 97% wt/wt, at least 96% wt/wt, at least 95% wt/wt, at least 90% wt/wt, or at least 85% wt/wt relative to the weight of the other constituents. In certain embodiments, the concentration of the aluminum in the aluminum mixture is 85-99% wt/wt, 90-99% wt/wt, 95-99% wt/wt, 96-99% wt/wt, 97-99% wt/wt, or 97-98.5% wt/wt, relative to the weight of the other constituents.

The aluminum mixture can be subjected to one or more thermal shock heating cycles in a container having a screw cap. The atmosphere can be air or nitrogen gas. The screw cap can be a bolt-like component whose turning allows precisely tuning the opening and physic-chemical processes in the aluminum powder mixture. The turning of the cap is critical to the optimal release and oxidation of undesired hydrocarbon gases and the suction of nitrogen.

Thermal shock heating cycles can independently comprise heating the aluminum mixture at a rate of 40-400° C. min$^{-1}$ to 450-650° C. thereby forming a heat shocked aluminum mixture. In certain embodiments, the heat shocked aluminum mixture is subsequently annealed between 450-600° C., 400-500° C. 450-550° C., 450-500° C., 550-600° C., or 500-600° C. 500-650° C. The aluminum mixture can be heated at a rate of 40-400° C. min$^{-1}$, 40-350° C. min$^{-1}$, 40-300° C. min$^{-1}$, 40-250° C. min$^{-1}$, 40-200° C. min$^{-1}$, 40-150° C. min$^{-1}$, 40-100° C. min$^{-1}$, 100-400° C. min$^{-1}$, 150-400° C. min$^{-1}$, 200-400° C. min$^{-1}$, 250-400° C. min$^{-1}$, 300-400° C. min$^{-1}$, or 350-400° C. min$^{-1}$.

The aluminum mixture can be subjected to one or two thermal shocks before the annealing. 1, 2, 3, 4, 5, 6, 7, 8, 9, 10, or more thermal shock heating cycles. In certain embodiments, the aluminum mixture can be subjected to 1-5, 1-4, 1-3, 1-2, 2-5, 2-4, 2-4, or 2-3 thermal shock heating cycles.

The heat shocked aluminum mixture can be annealed at a temperature between 450-650° C.

The heat shocked aluminum mixture can be annealed for a period from 6 to 600 min. In certain embodiments, the heat shocked aluminum mixture is annealed for a period of 6 to 540 min, 6 to 480 min, 6 to 420 min, 6 to 360 min, 6 to 300 min, 30 to 300 min, 30 to 240 min, 30 to 180 min, 30 to 120 min, or 30 to 60 min.

The heat shocked aluminum mixture can be annealed in the air or nitrogen gas or an atmosphere comprising $O_2$, $N_2$, $CO_2$, $H_2O$ or in any combination of $O_2$, $N_2$, $CO_2$ and $H_2O$.

The present disclosure also provides a method of generating hydrogen ($H_2$) comprising: contacting an aqueous solution with an activated aluminum composite comprising aluminum, AlN, $\gamma$-$Al_2O_3$, and a carbonaceous material thereby forming $H_2$.

In certain embodiments, the aqueous solution comprises tap water, distilled water, seawater, reclaimed water, river water, lake water, waste water, rain water, or a combination thereof. In certain embodiments, the water is not added, but bonded to for instance, or $Al(OH)_3 \times xH_2O$ present in the structure of the activated aluminum composite.

The aqueous solution can be neutral (pH 7) or have a pH greater than 7. In certain embodiments, the pH of the aqueous solution is greater than 7.5, greater than 8.0, greater than 8.5, greater than 9.0, greater than 9.5, greater than 10.0, greater than 10.5, greater than 11.0, greater than 11.5, greater than 12.0, greater than 12.5, greater than 13.0, greater than 13.5, or greater. Advantageously, the methods described herein can be conducted in pure water without the use of acids or bases.

In certain embodiments, the pH of the aqueous solution is between 7.0-7.5, 8-14.0, 8.5-14.0, 9.0-14.0, 9.5-14.0, 10.0-14.0. 10.5-14.0. 11.0-14.0, 11.5-14.0, 12.0-14.0, 12.4-13.4, 12.5-14.0, 13.0-14.0, 13.0-13.4, or 13.5-14.0.

Any base that is at least partially soluble in the aqueous solution can be used to adjust the pH of the aqueous solution. In certain embodiments, the base is a metal hydroxide. Exemplary metal hydroxides include, but are not limited to, LiOH, NaOH, KOH, RbOH, CsOH, $Mg(OH)_2$, $Ca(OH)_2$, $Sr(OH)_2$, and $Ba(OH)_2$. In certain embodiments, the aqueous solution comprises the metal hydroxide at a concentration between 0.01-10M, 0.01-5M, 0.01-4M, 0.01-3M, 0.01-2M, 0.01-1M, 0.01-0.9M, 0.01-0.8M, 0.01-0.7M, 0.01-0.5M, 0.01-0.4M, 0.01-0.3M, 0.01-0.25M, 0.05-0.25M, 0.05-0.20M, 0.1-0.2M, 0.025-0.25M, 0.0625-0.25M, 0.125-0.25M, or 0.0625-0.125M.

Advantageously, hydrogen generation can be conducted in aqueous solutions with lower pH if a salt is added to the aqueous solution. The selection of the salt is not particularly limited. In certain embodiments, the salt comprises one or more cations selected from the group consisting of $Li^+$, $Na^+$, $K^+$, $Mg^+$, $Ca^+$, and $NH_4^+$ and one or more anions selected from the group consisting of $Br^-$, $Cl^-$, $F^-$, $I^-$, $NO_3^-$, $CO_3^{2-}$, $SO_4^{2-}$, and $PO_4^{3-}$. Exemplary salts include, but are not limited to, NaCl, KCl, and $CaCl_2$. The salt may be present in the aqueous solution at a contraction of 4% wt/wt or less, 3.5% wt/wt or less, 3% wt/wt or less, 2.5% wt/wt or less, 2% wt/wt or less, 1.5% wt/wt or less, 1% wt/wt or less, or 0.5% wt/wt or less.

Hydrogen generation can be conducted at any temperature in the range from 20 to 100° C. in the presence of water or up to 400° C. when the water is mainly released from the composite microstructure, for instance, $Al(OH)_3 \times xH_2O$. In general, the rate of hydrogen generation will increase at elevated temperatures. In certain embodiments, activated aluminum composite and the aqueous solution are contacted at a temperature between 20-40° C., 20-30° C., 40-60° C., 60-80° C., or 80-100° C.

The rate of hydrogen generation can be adjusted by modification of the hydrogen generation conditions such as the concentration of the base. In certain embodiments, of 125 to 500 ml min$^{-1}$ of hydrogen is produced per gram of activated aluminum composite, wherein the volume of hydrogen is measured at standard temperature and pressure.

FIG. 1 schematically illustrates the production of activated aluminum composite in accordance with certain embodiments described herein. Step (10) comprises providing aluminum particles, in a particular geometry. These particles can contain a small fraction of fatty acids or salts thereof (e.g., metal stearates) on the surface. In certain embodiments, the mass percentage of fatty acids on the initial aluminum flakes ranges from 0 to 5 wt %. In certain embodiments, the aluminum particles comprise spherical shapes between 1-30 μm in size and flakes are between 1-30 μm across and 10-100 nm in thickness. An exemplary microimage of the initial aluminum particles is shown in FIG. 2. The specific surface area of the initial aluminum particles can be relatively high, such as from 16,000 to 60,000 cm$^2$ g$^{-1}$ or from 4 to 21 m$^2$ g$^{-1}$ in terms of the water covering and Brunauer-Emmett-Teller (BET) surface, respectively.

Figure 3:
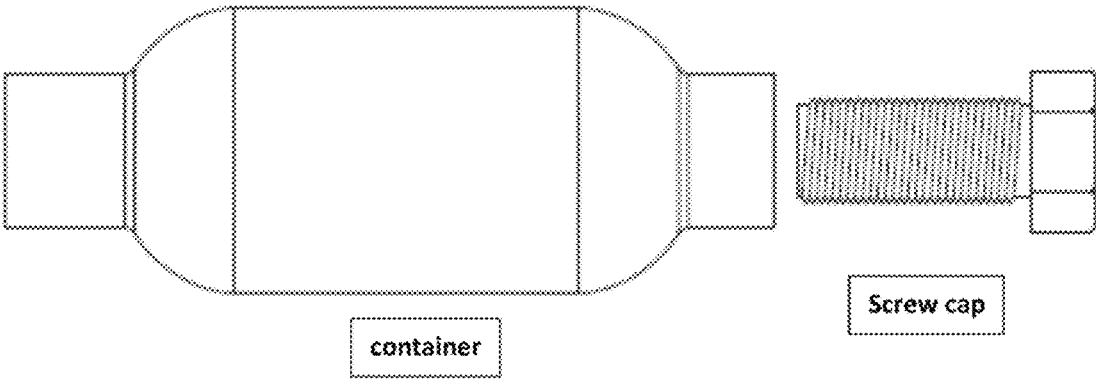
FIG. 3 illustrates a steel container with a semi-permeable cap for optimizing the gas exchange between the atmosphere and initial Al particles.

Step (20) comprises loading the initial aluminum flakes and additional amounts of fatty acids or salts thereof into a metal container. The addition of these fatty acids or salts thereof can range from 0 to 40 wt %. The container has a permeable screw cap, see FIG. 3. In certain embodiments, the container wall thickness is not smaller than 0.3 mm and not larger than 3 mm for providing optimal heat transfer from a furnace heating zone to the aluminum flakes. In certain embodiments, the container material is nickel steel, stainless steel or copper. In certain embodiments, chunks of partially sintered Ni particles are added into the container for catalyzing the synthesis of the aluminum composite particles.

In step (30), the container is subject to thermal shock ($40$-$400°$ C. $min^{-1}$) temperature increase to between 450-650° C. This thermal shock heating enables progressive rupture and irregular crystallization of the alumina skin am-$Al_2O_3$ skin into $\gamma$-$Al_2O_3$. At the same time, the carbonaceous precursor or salt thereof can decompose and partially inhibit the uniform formation of the alumina skin, which triggers the Al nitridation. The heat treatment can lead to the formation of composite material comprising carbon, aluminum, nitrogen, and oxygen. The aluminum flakes can be subject to one or more thermal shocks to achieve the desired activation level. In certain embodiments, the aluminum flakes are additionally annealed at a temperature between 450-650° C. for a period from 6 to 600 min. The step of annealing can be conducted in an atmosphere of air or in an atmosphere comprising any combination of gas selected from the group consisting of $N_2$, $H_2O$ and $CO_2$.

Figure 4:
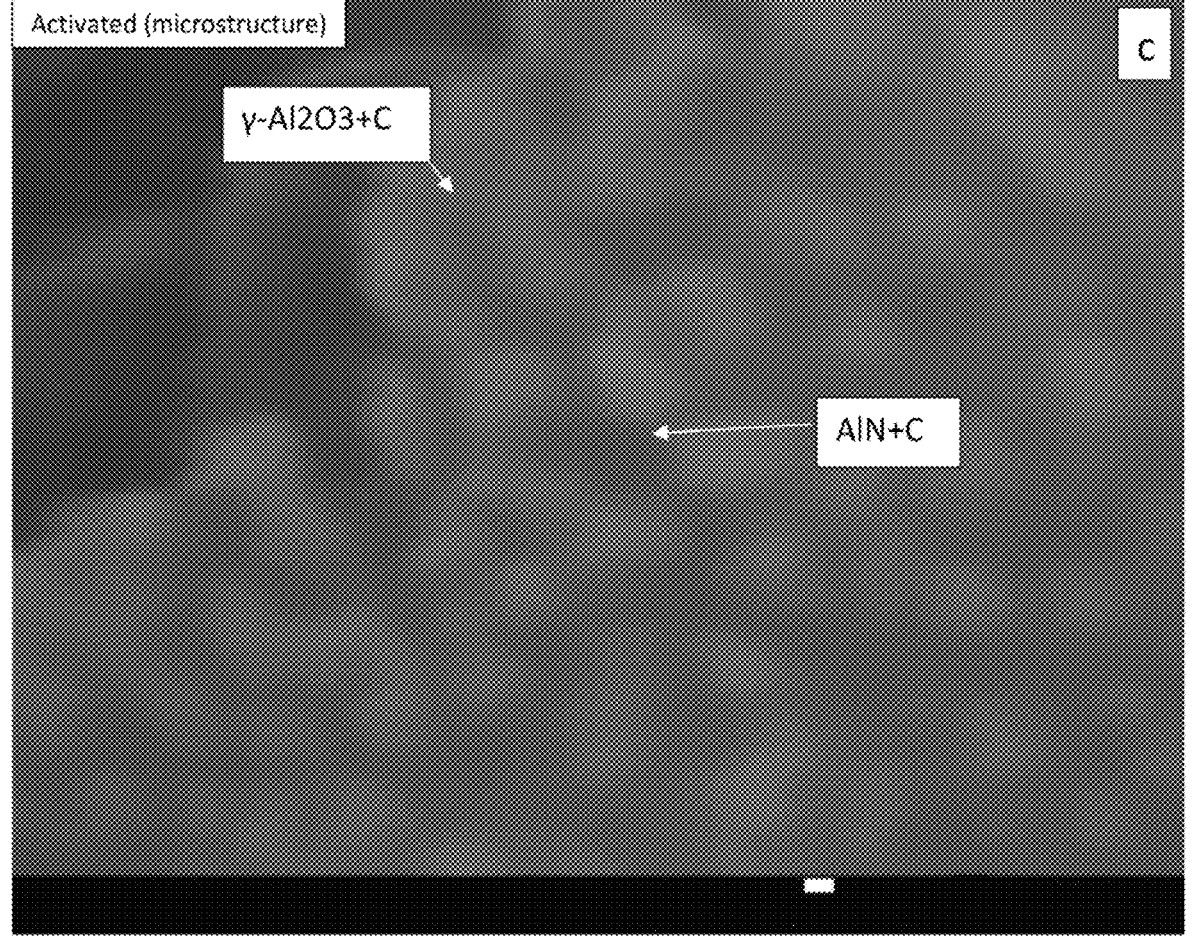
FIG. 4 shows SEM images of initial aluminum particles (A) and activated aluminum composite (B), (C) in accordance with certain embodiments described herein.
Figure 5:
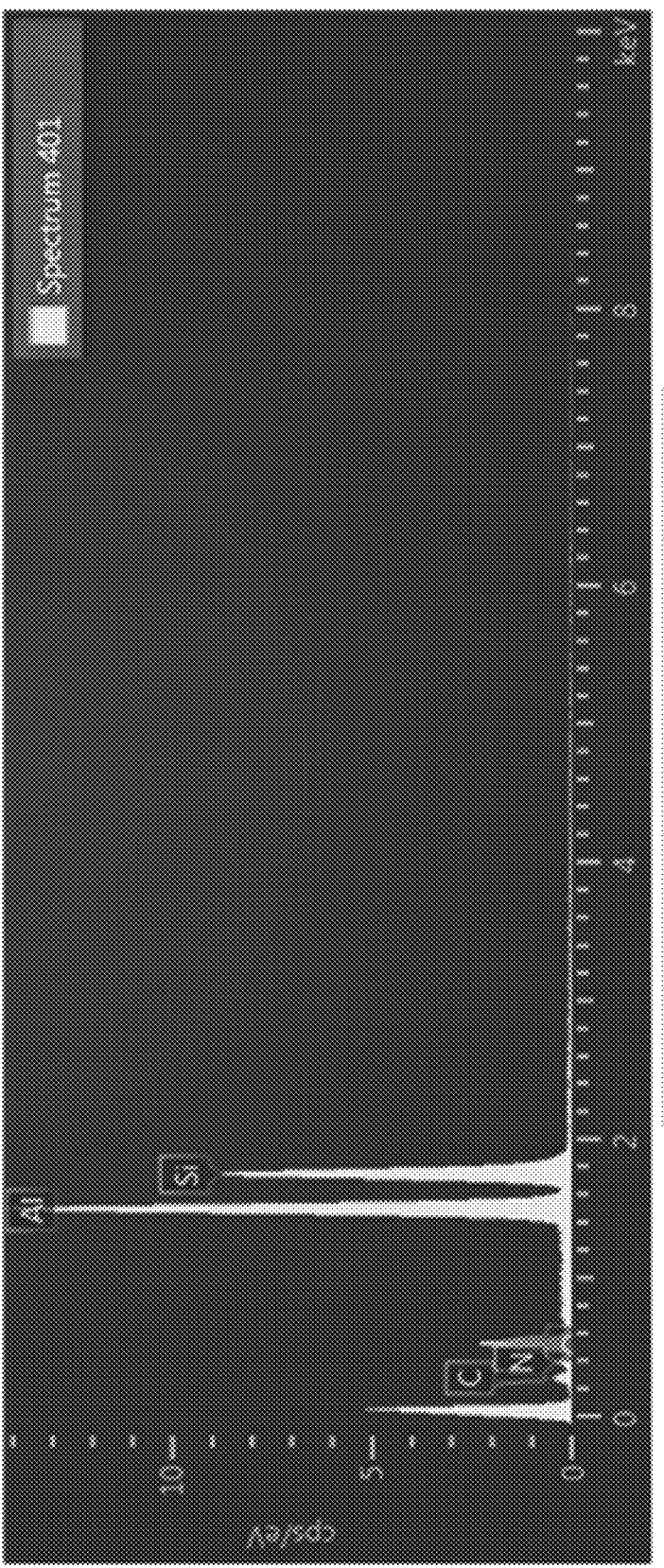
FIG. 5 shows the energy-dispersive X-ray spectroscopy (EDS) spectrum of the activated aluminum composite in accordance with certain embodiments described herein.
Figure 6:
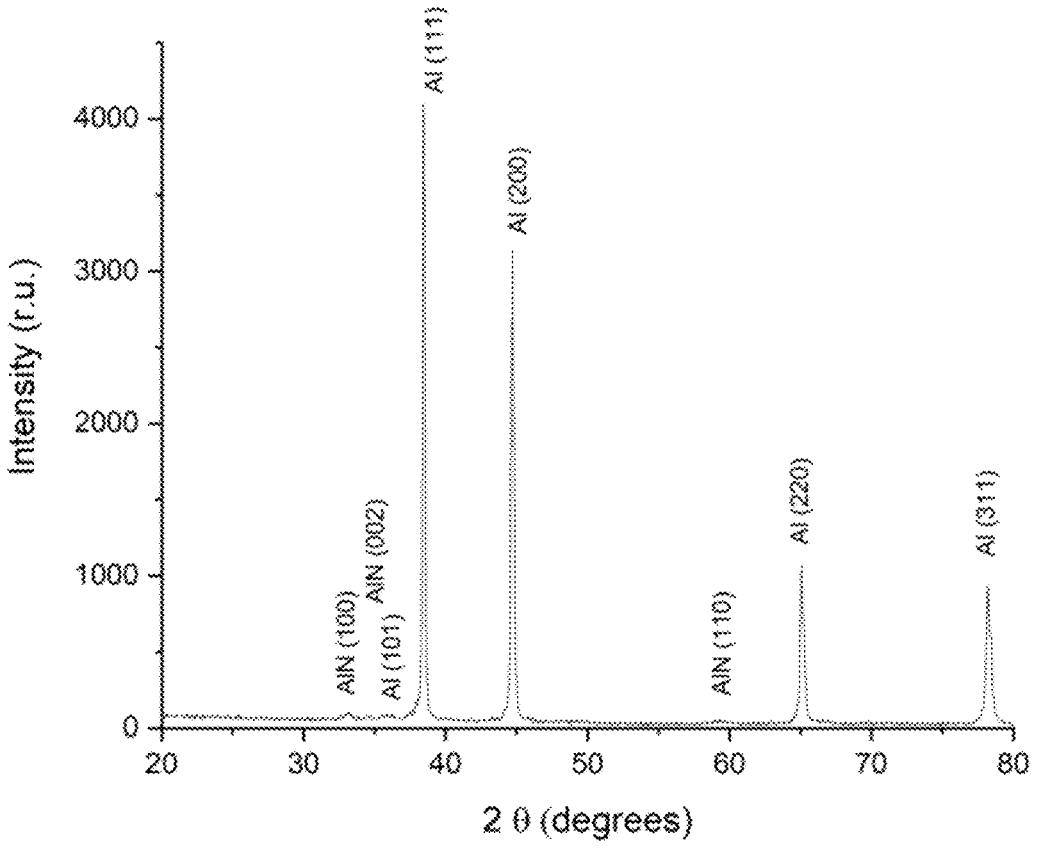
FIG. 6 shows the X-ray diffraction (XRD) spectrum of the activated aluminum composite particles in accordance with certain embodiments described herein.

In step (40), the container is cooled at a rate of $40$-$400°$ C. $min^{-1}$ and the activated aluminum composite particles can then be removed and optionally milled. FIG. 4 shows a microimage of the activated aluminum composite particles. Although the main element is aluminum, more than 85 wt %, the EDS identified carbon which can reach a concentration of ~13 wt % at some sites in the activated aluminum composite (see FIG. 5). In certain embodiments, the carbon concentration can range from 10 to 30 wt % in some sites of the activated aluminum composite. In certain embodiments, the carbon can be present in a complex form having chemical bonds with aluminum, oxygen, and nitrogen. In certain embodiments, AlN in the composition can be seen using X-ray diffraction (FIG. 6).

Step (50) comprises compaction of the activated flakes into porous cassettes to increase the volumetric hydrogen density. The cassettes are a convenient form of handling the activated aluminum composite particles and can provide safe long-time storage, which is resistant to the effects of humidity, and fire. Partial generation of $H_2$ from the cassettes leads to the formation of $Al(OH)_3$ and its hydrates and no needs in water in some application. In this case it requires temperatures up to 400° C. to release the bonded water from its structure. The compaction of the activated composite particles can be carried out using one or more machines for densification, such as presses, extruders, and other machines. In certain embodiments, the flake densification is partial such that the cassettes comprise open-pore channels.

Figure 7:
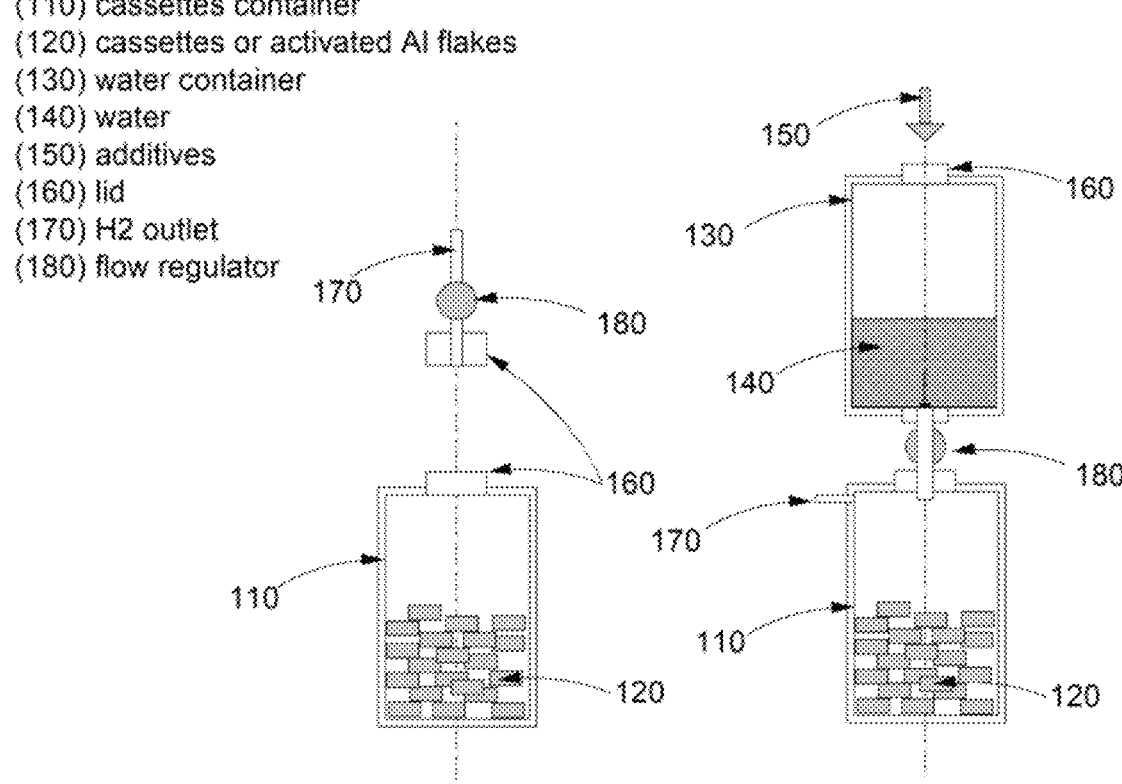
FIG. 7 schematically depicts an exemplary system for hydrogen generation and incorporation using activated aluminum composite and/or cassettes in accordance with certain embodiments described herein.

Also provided herein is a system for storage and hydrogen generation in step (60). FIG. 7 shows an exemplary schematic drawing for the implementation of step (60). A container (110, 130) for the cassettes of activated aluminum composite (120) and water (140) can be made of carbon steel, glass, titanium, high-density polyethylene, low-density polyethylene, polypropylene, and other rigid and heat-resistant polymers. The container (130) can be refilled with water (140) and hydroxide additives (150) after opening a screw cap (160). The containers (110,130) can be cylindrical in certain embodiments. In certain embodiments, the containers can be connected by pipes in parallel. Every container has a main body (110, 130) and screw cap (160) for convenient opening, loading the aluminum cassettes/activated aluminum composite, and unloading the reaction product. The convenience in the unloading of aluminum hydroxide is a part of certain embodiments as it is a valuable product. Therefore, the container can be reused for many loading/unloading cycles. A screw cap (160) can have a pipe inlet and outlet (170) with a water flow regulator (180). Other pipes are present for the generated gases' distribution and filtration. In certain embodiments, the cassettes or activated aluminum composite (120) can be loaded into the container with a water-degradable pack comprising an alkali activator (150), for instance, NaOH. This way, the loaded container can be supplied with pure water (140). The containers (130) can be filled with an effective alkaline solution in certain embodiments. Hydrogen or hydrogen-containing mixture is released through the outlets (170). In some embodiments, the water container (130) can be filled with tap water, seawater, groundwater, or heavy water. The cassettes (120) can undergo soaking and curing in water, steam, or humid air, and heat exposure in some embodiments. This processing can last from hours to days, depending on the mass, porosity, composition, heat intensity. It leads to the partial generation of hydrogen and forming $Al(OH)_3$ in-situ in order to provide a dry composition with bonded water. This example of chargeable cassettes (121) can be dried and loaded into a container (110). The incorporated hydrogen can be released by the reaction of Al and $Al(OH)_3$ when heating the charged cassettes (121) to temperatures up to 400° C. The cassettes (121) can generate hydrogen without adding water by applying heat solar radiation in some embodiments. On the other hand, the cassettes (120) can require higher temperatures or an alkaline water solution for the complete release of hydrogen. For instance, the cassettes (120) completely release hydrogen in water with NaOH, ranging from 0.1 to 1 wt % (0.025-0.25 M NaOH) and more preferably from 0.3 to 0.6 wt % (0.1-0.2 M NaOH). In some embodiments, the hydroxide concentration can be reduced by adding salts, such as NaCl, KCl, $CaCl_2$, not more than 4 wt %, and more preferably not more than 3 wt %. In some preferable embodiments, hydrogen generation efficiently proceeds in seawater.

All of these embodiments are intended to be within the scope of the invention herein disclosed. It will be appreciated that elements 110-180 schematically illustrated in FIG. 7 are considered more integrated or separated or replaced as is useful in accord with a particular application.

The effectiveness of the activated aluminum composite and cassettes is further described in examples. The hydrogen generation yield and rate were measured by the water displacement method at a temperature of 22° C. The average size of the activated composite particles ($D_{50}$, $\mu m$) is the value obtained by measuring with a MICROTRAC particle-size analyzer.

EXAMPLES

Example 1

The activated Al composite is produced from a leafing aluminum flake powder with an average particle size $D_{50}$ of 4.6 $\mu m$ and a WCA of about 48,000 $cm^2$ $g^{-1}$. These aluminum particles contained stearic acid, which fraction was about 3 wt %. This flake powder was loaded into a stainless-steel container and moved into a furnace at 600° C. The screw cap was set for three full turns, which allowed the buildup of excessive gases to be relieved and atmospheric nitrogen into the container. The container was subject to a single thermal shock through heating to 600° C., at 200° C./min, and annealing for 30 min at 600° C.

Figure 8:
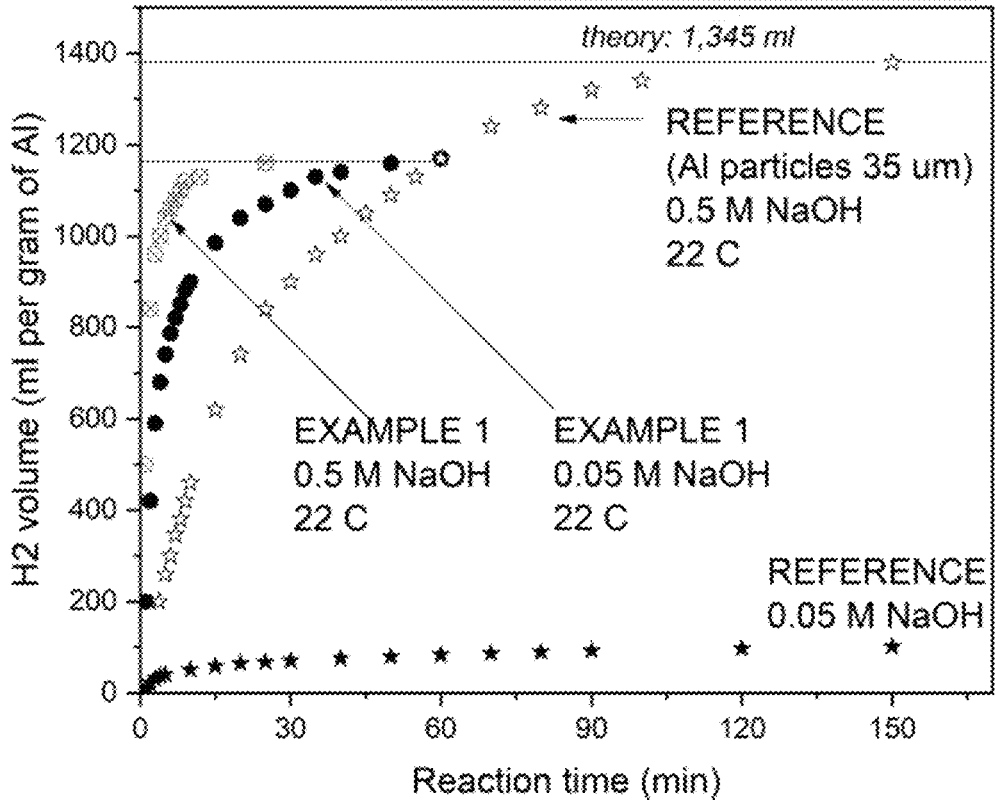
FIG. 8 shows example 1 comparing the hydrogen generation rates (ml min$^{-1}$ g$_{Al}$$^{-1}$) of a spherical aluminum powder (reference) and activated aluminum composite in 0.05 and 0.5M NaOH solution in accordance with certain embodiments described herein.

FIG. 8 compares the hydrogen generation from the activated aluminum composite particles in Example 1 and spherically shaped aluminum microparticles (35 μm) in 0.05 M NaOH and 0.5 M NaOH. The mass of each sample was one gram, which theoretically complete oxidation yields 1,345 ml of hydrogen at a temperature of 22° C. As seen in FIG. 8, the activated aluminum composite in 0.5M NaOH starts generating hydrogen at a rate of 500 ml min$^{-1}$ g$_{Al}$$^{-1}$, decreasing with time. A hydrogen volume of 1,120 and 1,160 ml is generated in 10 and 25 min, respectively. This maximum volume corresponds to a reaction yield of 87% when compared with the hydrogen volume from the spherically shaped aluminum microparticles. That is the fraction of Al in the composite is 87%. It should be noted that initial Al flake particles are covered with stearic acid and do not produce hydrogen even in alkaline water solutions. The reference microparticles are rather active in 0.5 M NaOH and the kinetics is shown for defining the theoretical H$_2$ limit.

FIG. 8 also shows the effect of NaOH concentration on the reaction kinetics for the activated aluminum composite from Example 1. Although the reaction rate is slightly slower in 0.05 M NaOH, it proceeds completely. However, the reference particles in 0.05 NaOH produce only about 100 ml of H$_2$ in 8 hours.

Figure 9:
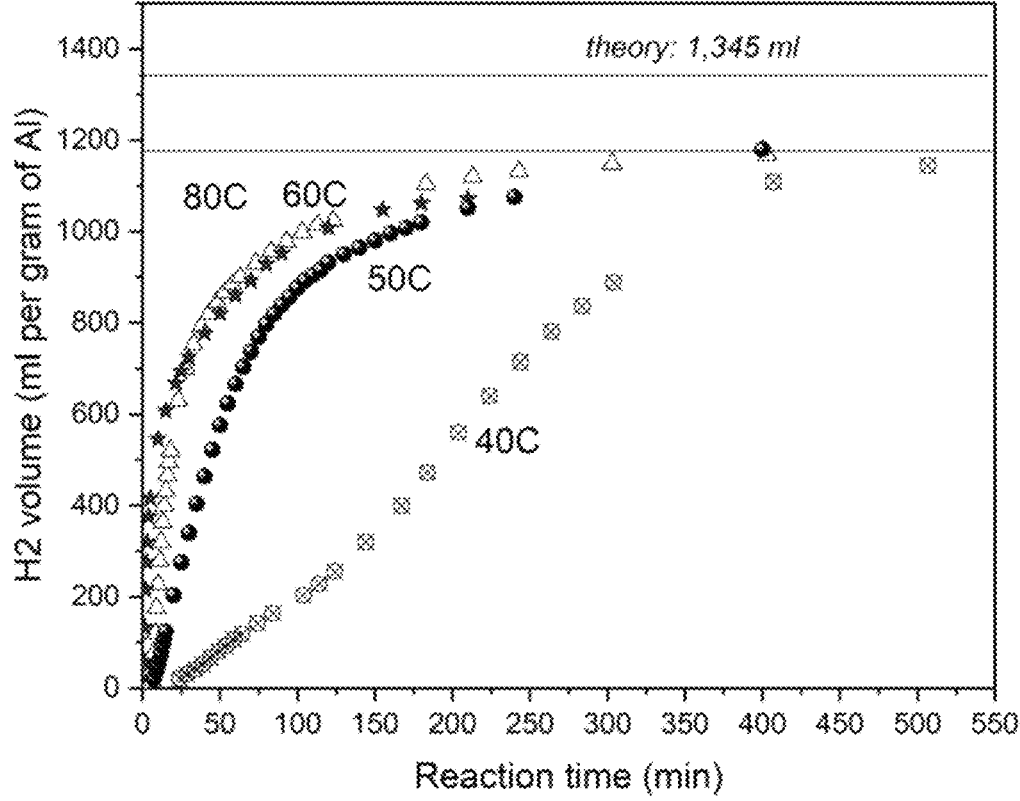
FIG. 9 shows the influence of the temperature (40-80° C.) on the hydrogen generation rates (ml min$^{-1}$ g$_{Al}$$^{-1}$) from the activated aluminum composite in distilled water in accordance with certain embodiments described herein.

FIG. 9 shows that the activated Al composite particles can completely generate hydrogen in water without NaOH but at temperatures below 100° C. The optimal temperature can range from 40 to 60° C. The reference Al particles do not generate hydrogen in distilled water.

Example 2

Figure 10:
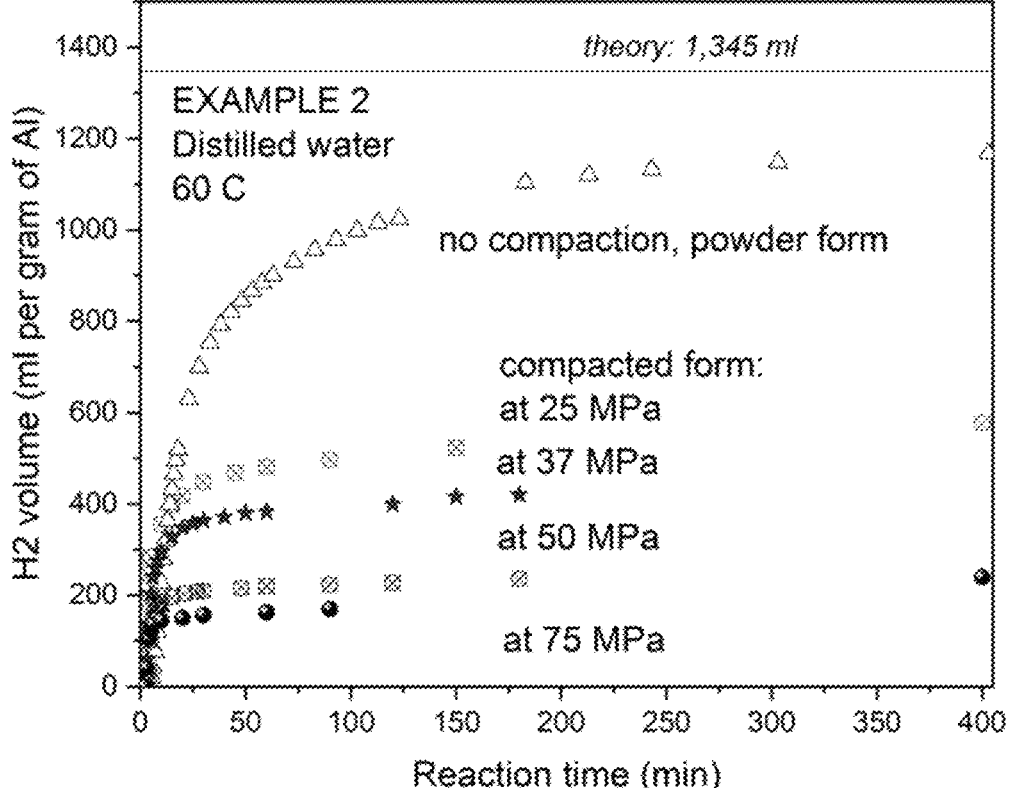
FIG. 10 shows Example 2 with the effect of the densification of an activated aluminum composite on the hydrogen generation rates (ml min$^{-1}$ g$_{Al}$$^{-1}$) in distilled water at 60° C. in accordance with certain embodiments described herein.

This example shows the influence of densification on hydrogen generation in distilled water at 60° C. (FIG. 10). Here, the activated Al composite particles were densified using Cold Isostatic Compression at 25 MPa (Ex 2-1), 37 MPa (Ex 2-2), 50 MPa (Ex 2-3), and 75 MPa (Ex 2-4). Although the reaction rate decreases with higher compaction density, the partial generation of hydrogen creates Al(OH)$_3$ and its hydrates next to Al in the microstructure. Such compositions do not require liquid water for hydrogen generation and the reaction Al+Al(OH)$_3$=1.5H$_2$+Al$_2$O$_3$ goes in the temperature range from 100 to 300° C. Sample Ex 2-1 generated about 577 ml of H$_2$ in distilled water at 60° C. After drying at 120 for 20 hours, the charged sample was put in a 20 ml vial connected to the water displacement system. The vial was rapidly (in 3-4 min) heated on a hot plate to a temperature of about 350° C. Over the course of heating, the sample released about 480 ml of hydrogen.

It should be noted that the discharging temperature can be much higher, up to 400° C., which is reachable using solar concentrators, furnaces, or other facilities.

A leafing aluminum flake powder with an average particle size D$_{50}$ of 30 μm and a BET surface area of 7 m$^2$ g$^{-1}$ was provided. These aluminum particles contain stearic acid having a fraction of 1.5 wt %. The water coverage of these particles was about 16,000 cm$^2$ g$^{-1}$. This powder was loaded in a stainless-steel container having an outlet about 1 mm in diameter. This container was moved into a furnace heating zone at a temperature of 580° C. The media around the container was a flowing atmosphere of nitrogen (99.99%). The container was subject to three thermal shocks 450 to 150° C. and 150 to 450° C. followed by and 40 min of annealing at 450° C. After the annealing and cooling to about at a cooling temperature of 150° C., the atmosphere was changed to air, and the container was additionally annealed for 120 min. The activated aluminum composites were compacted using cold isostatic compression at 20 MPa into cassettes with a porosity of about 60%. In this example, the oxidation of the activated aluminum composite was conducted in tap water heated up to 60° C. using an infrared lamp (275 kW). The hydrogen generation rate with the temperature is depicted in FIG. 7. This experiment demonstrates a moderate rate of hydrogen generation, 3-11 ml min$^{-1}$ and the possibility to produce H$_2$ using solar irradiation.

Example 3

Spherical Al particles with a diameter of about 1 μm and a BET surface area of 3 m$^2$ g$^{-1}$ were provided. The container with these Al particles was closed with the screw cap (2 turns) and put into the furnace pre-heated to 600° C. A triple thermal shock was created by heating to 600° C., cooling to 100° C., and heating to 600° C. The shock heat treatment was followed by the annealing at 600° C. for 20 min. After a rapid (100° C./min) cooling to room temperature, the activated Al particles were removed from the container.

Figure 11:
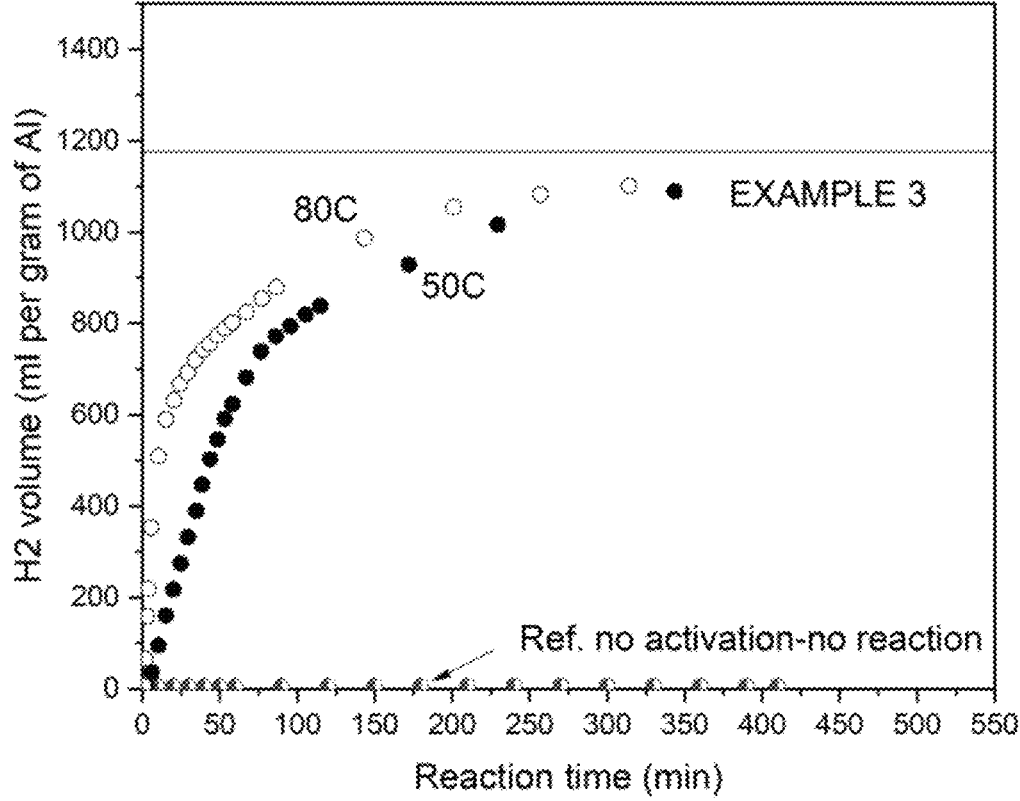
FIG. 11 shows the hydrogen generation rates (ml min$^{-1}$ g$_{Al}$$^{-1}$) in distilled water by using 1-$\mu$m aluminum particles with (Example 3) and without (reference) activation in accordance with certain embodiments described herein.

FIG. 11 shows the kinetics of hydrogen generation from Example 3 in distilled water at 50 and 80° C. The reaction rate is lower than that of Example 1 but this does not have to limit this solution in certain applications. It should be noted that initial Al particles (1 μm) do not produce hydrogen in the similar conditions.

Example 4

Fine aluminum particles for the heat treatment were produced by cutting Al cans (Coca-Cola) that had an epoxy coating. This example shows the applicability of relatively large Al particles and scrap which is difficult to sort and recycle. The size of cut pieces can be as large as 8 mm across. The epoxy coating served as a source of the incorporated carbon while the nitridation effect can be enhanced using water added (1 wt % of the scrap) to the container. The screw cap on the loaded container was set to 1 turn. The container was put into the furnace at 650° C. to create the thermal shock and initiate the chemical reactions. The container was further annealed for 60 min and cooled down to a temperature of 22° C. at 200° C./min. During the annealing, epoxy layers break down while nitrogen and carbon are introduced into the aluminum microstructure.

Figure 12:
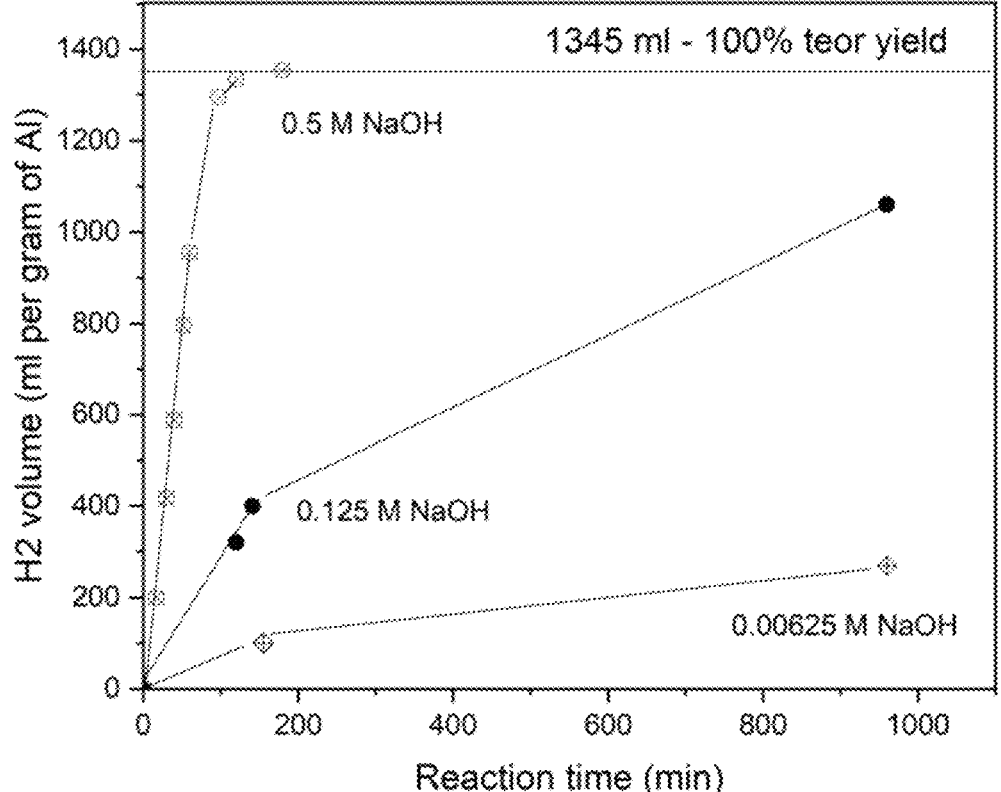
FIG. 12 shows the influence of the water solution molarity (0.0625-0.5M NaOH) on the hydrogen generation rates (ml min$^{-1}$ g$_{Al}$$^{-1}$) from the activated aluminum composite made of aluminum can scraps (Example 4) in accordance with certain embodiments described herein.

The kinetics of hydrogen generation from the active composite particles in NaOH solutions of different concentrations are shown in FIG. 12. It is shown that the H$_2$ generation can nearly reach a theoretical value of 1,345 ml in 0.5 NaOH. The other examples show the reaction rate decreases with lower concentrations of NaOH. This does not have to limit the application of these activated Al composites as the kinetics can be enhanced at higher temperatures.

A leafing aluminum flake powder with an average particle size D$_{50}$ of 10 μm and BET surface area of 8.4 m$^2$ g$^{-1}$ was provided. The water coverage of these particles was about 26,000 cm$^2$ g$^{-1}$. The fraction of stearic acid was ~2 wt %. About 25 g of this powder were mixed with 5 g of stearic acid and loaded into a stainless-steel container with a screw cap. This container was then placed into a furnace at 500° C.

in the air. The container was subject to one thermal shock and 60 min of annealing at 500° C. At a cooling temperature of 110° C., the screw cap was removed and the opened container was additionally annealed for 30 min. The activated aluminum powder ($\approx$2 g) was compacted at 46 MPa into cassettes with a porosity of 45%. This cassette was placed in distilled water for 24 hours. After 12 hr of drying at 30° C., this cassette becomes charged had a mass of 3.2 g. A fraction of the stored hydrogen was released by heating this charged cassette (Example 3) using an infrared lamp (275 kW). Over the temperature rise to about 110° C., this sample released about 184 ml of hydrogen. The charging-discharging cycle is repeatable by soaking the discharged sample in water for 12-24 hours. It should be noted that the discharging temperature can be much higher, up to 400° C., which is reachable using solar concentrators, furnaces, or other facilities.

What is claimed is:

1. A method of generating hydrogen ($H_2$) comprising contacting an aqueous solution with an activated aluminum composite comprising aluminum, $\gamma$-$Al_2O_3$, AlN and optionally a carbonaceous material thereby forming $H_2$.

2. The method of claim 1, wherein the activated aluminum composite comprises aluminum composite flakes having a diameter $D_{50}$ of 1-50 $\mu$m and a thickness $D_{50}$ of 10-100 nm.

3. The method of claim 1, wherein a layer comprising the $\gamma$-$Al_2O_3$, the AlN, and optionally the carbonaceous material is disposed on the surface of the aluminum.

4. The method of claim 1, wherein the carbonaceous material comprises carbon and one or more elements selected from the group consisting of nitrogen and oxygen.

5. The method of claim 1, wherein the carbonaceous material is prepared by carbonization of a carbonaceous material precursor selected from the group consisting of a carboxylic acid, a polyvinyl alcohol, an epoxy resin, and salts thereof.

6. The method of claim 5, wherein the carbonaceous material precursor is a $C_6$-$C_{25}$ saturated carboxylic acid, a $C_6$-$C_{25}$ unsaturated carboxylic acid, or a salt thereof.

7. The method of claim 5, wherein the carbonaceous material precursor is lauric acid, palmitic acid, stearic acid, or a salt thereof.

8. The method of claim 1, wherein the activated aluminum composite comprises at least 85% of aluminum by weight.

9. The method of claim 1, wherein the activated aluminum composite comprises aluminum composite flakes has a diameter $D_{50}$ of 10-30 $\mu$m and a thickness $D_{50}$ of 10-100 nm; the carbonaceous material is prepared by carbonization of a carbonaceous material precursor selected from the group consisting of a carboxylic acid, a polyvinyl alcohol, and salts thereof; and the activated aluminum composite comprises at least 87% of aluminum by weight.

10. The method of claim 1, wherein the activated aluminum composite is prepared from aluminum component machining, aluminum cans or aluminum scrap; and the aluminum composite comprises particles ranging from 1 to 10,000 $\mu$m in length and having a thickness of less than 500 $\mu$m.

11. The method of claim 9, wherein the carbonaceous material is prepared by carbonization of stearic acid or a salt thereof.

12. The method of claim 1 further comprising providing an aluminum mixture comprising aluminum and optionally a carbonaceous material precursor;

subjecting the aluminum mixture to one or more thermal shock heating cycles, wherein the one or more thermal shock heating cycles independently comprise heating the aluminum mixture at a rate of 40-400° C. min$^{-1}$ to 450-650° C. thereby forming a heat shocked aluminum mixture; and annealing the heat shocked aluminum mixture at 450-650° C. thereby forming the activated aluminum composite.

13. The method of claim 12, wherein the aluminum mixture is subjected to 1-4 thermal shock heating cycles.

14. The method of claim 12, wherein the heat shocked aluminum mixture is annealed at a temperature between 500-650° C.

15. The method of claim 1, wherein the aqueous solution has a pH equal to or greater than 7.

16. The method of claim 1, wherein the aqueous solution has a pH 12.4-13.4 or 13-13.4.

17. The method of claim 1, wherein the aqueous solution comprises NaCl, KCl, or $CaCl_2$.

18. The method of claim 1, wherein the aqueous solution comprises distilled water or seawater.

19. The method of claim 1, wherein $H_2$ is generated at a rate less than 500 ml min$^{-1}$ per gram of activated aluminum composite, wherein the volume of generated $H_2$ is measured at a temperature of 22° C. and atmospheric pressure.

20. The method of claim 1, wherein the activated aluminum composite comprises aluminum composite flakes or spherical aluminum particles that have a diameter $D_{50}$ of 10-30 $\mu$m and a thickness $D_{50}$ of 10-100 nm; the carbonaceous material is prepared by carbonization of stearic acid; the activated aluminum composite comprises at least 85% of aluminum by weight; the aqueous solution has a pH 13-13.4; and $H_2$ is generated at a rate less than 500 ml min$^{-1}$ per gram of activated aluminum composite, wherein the volume of generated $H_2$ is measured at atmospheric pressure and temperature.

21. The method of claim 20 further comprising providing an aluminum mixture comprising aluminum and stearic acid; subjecting the aluminum mixture to one or more thermal shock heating cycles, wherein the one or more thermal shock heating cycles independently comprise heating the aluminum mixture at a rate of 40-400° C. min$^{-1}$ to 450-650° C. or cooling the aluminum mixture from 450-650° C. to 100-200° C. thereby forming a heat shocked aluminum mixture; and annealing the heat shocked aluminum mixture at a temperature between 450-650° C. thereby forming the activated aluminum composite.

\* \* \* \* \*